Feb. 27, 1951 Y. MATHIEU 2,543,185
ELASTIC JOINT FOR TUBES
Filed March 15, 1948 4 Sheets-Sheet 2
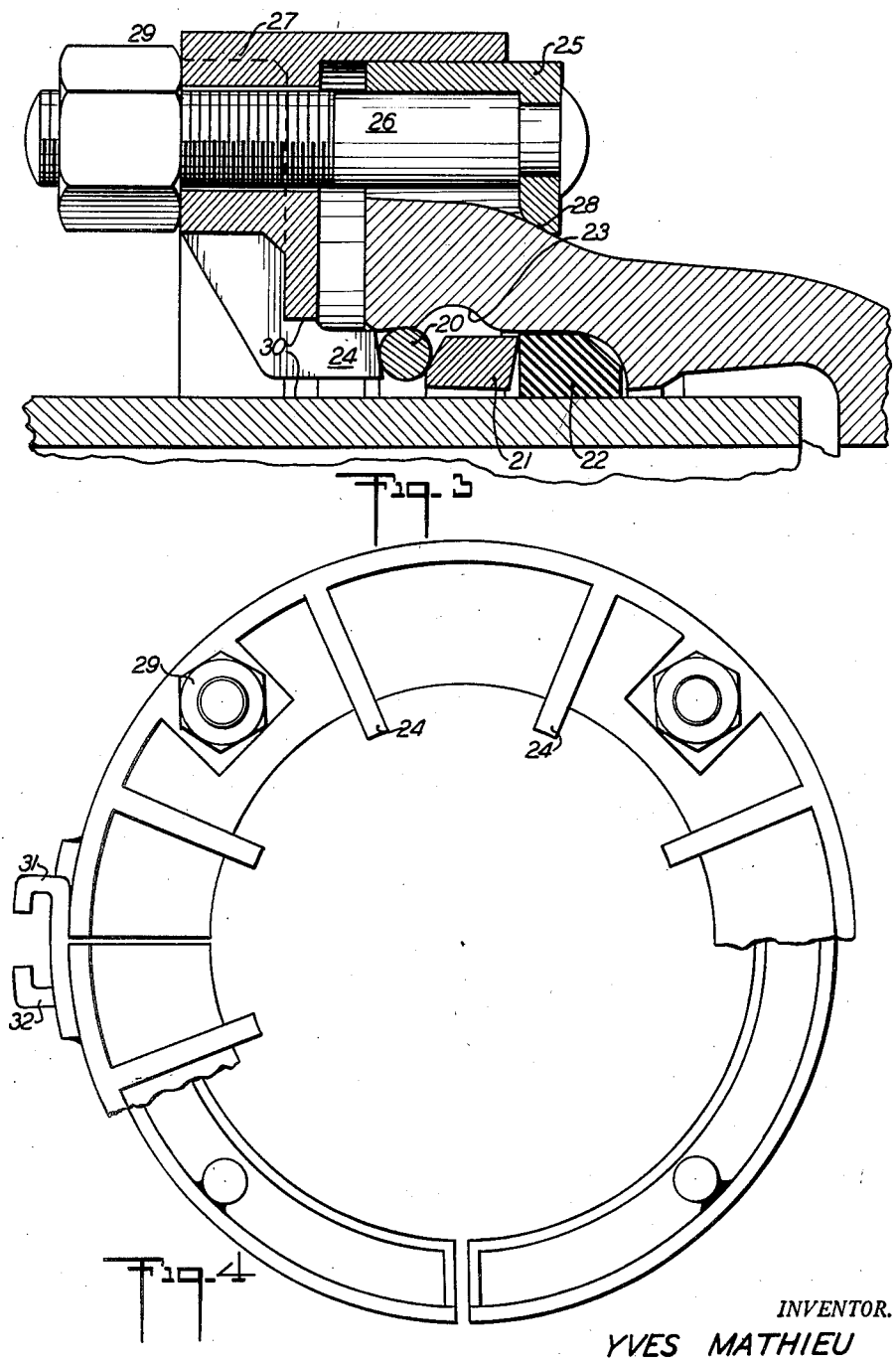
INVENTOR.
YVES MATHIEU
BY
Young, Emery & Thompson
Attys.

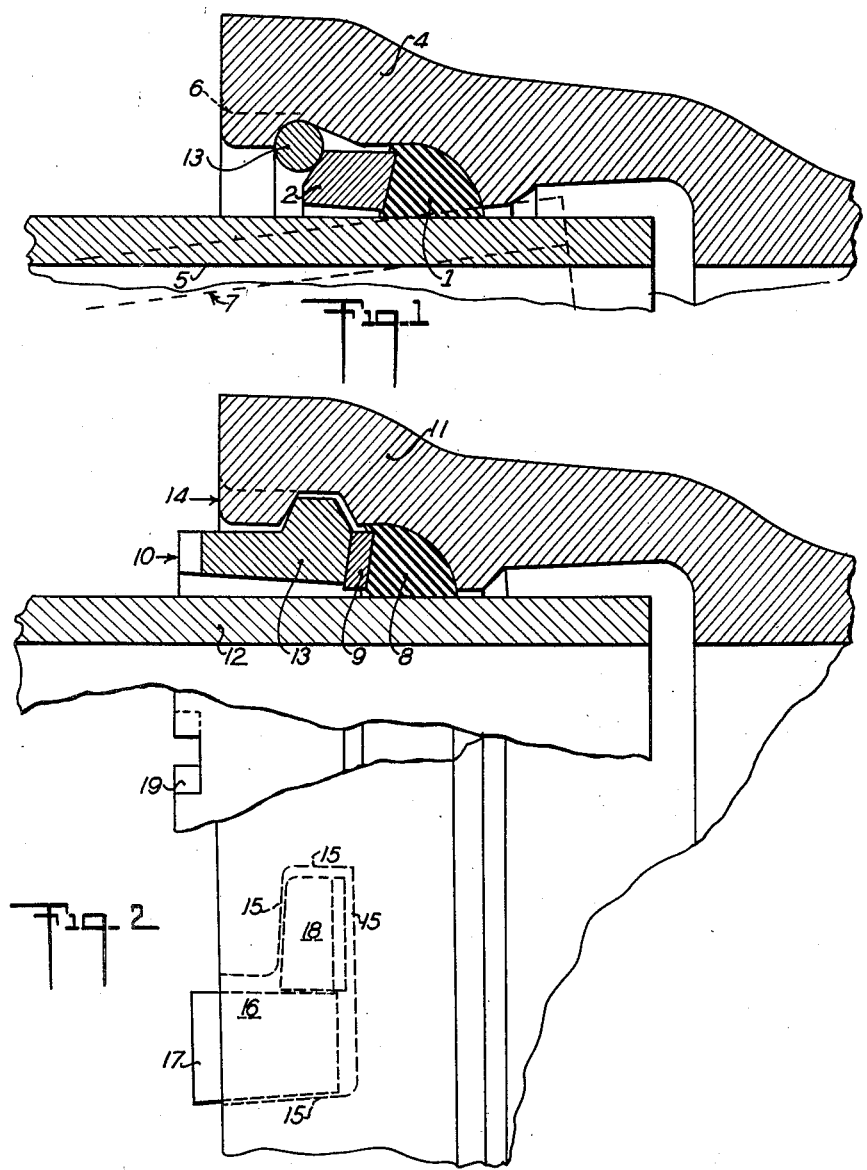

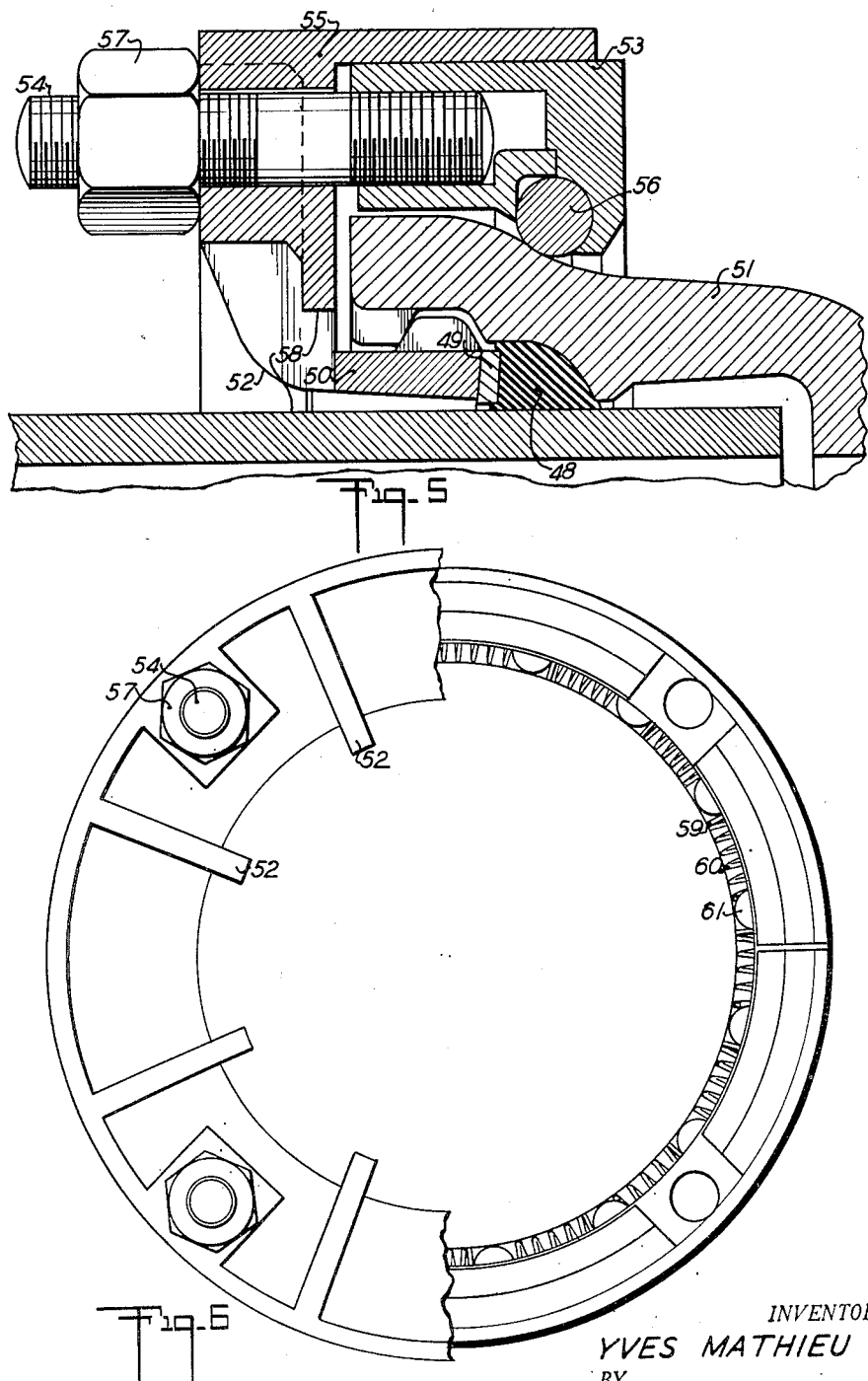

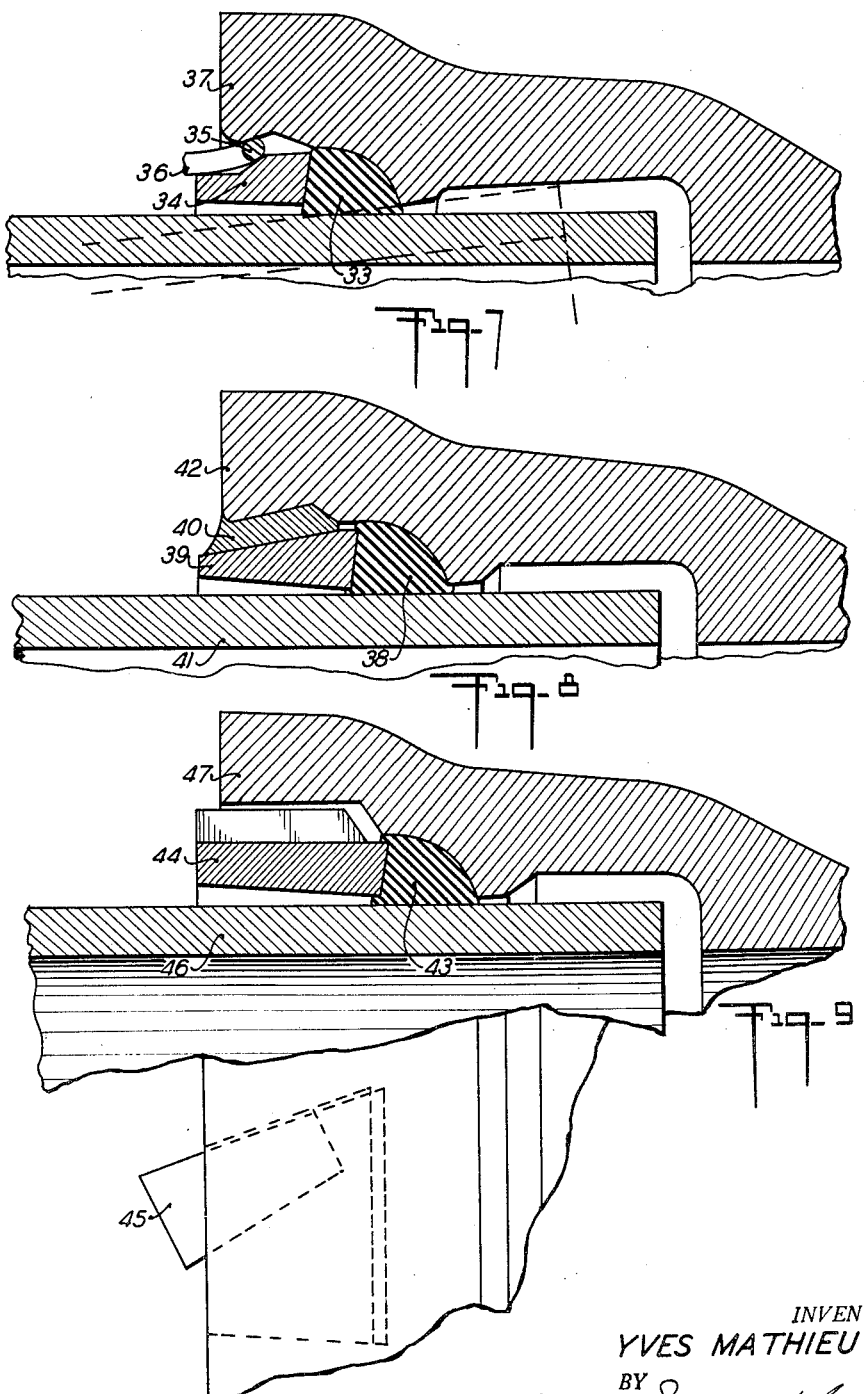

Patented Feb. 27, 1951

2,543,185

UNITED STATES PATENT OFFICE 2,543,185

ELASTIC JOINT FOR TUBES

Yves Mathieu, Rio de Janeiro, Brazil

Application March 15, 1948, Serial No. 14,907
In Brazil March 14, 1947

3 Claims. (Cl. 285—163)

The present invention relates to a new type of elastic coupling for pipes which in its different embodiments employs a new constructional device.

Besides the common type of coupling provided between cast iron pipes, steel pipes or pipes of other metals by the intermediary of a filling with rope and lead, there are a number of types of coupling in which stanchness is obtained by a rubber gasket strongly compressed between the walls of the pipes.

However, only a small number of couplings thus realized are entirely satisfactory, being the following the faults generally noted:
1. Insufficient resistance of the coupling to internal pressure of the lines;
2. Easy disengagement of the coupling by accident;
3. Rapid deterioration of the coupling by the fluid conveyed;
4. Difficulty or impossibility of disassembling due to rust;
5. Lack of flexibility;
6. Easy corrosion of assembly bolts;
7. Mechanical fragility with consequent ruptures;
8. Difficulty in correct positioning;
9. Positioning requires a long time and is delicate.

The last mentioned types of coupling of this kind eliminate practically these faults, though without presenting the constructional simplicity that one might expect.

Couplings known up to the present employ generally a series of bolts of a more or less intricate configuration, often requiring a special external form of receptacles leading to an exaggerated weight of the accessory parts of the coupling, as bolts, counter-flanges, etc.

The coupling described in the present specification pretends to offer a remedy to these faults, but without missing any of the advantages already obtained with former devices.

The invention is illustrated in the accompanying drawings in which:

Figure 1 is a longitudinal sectional view illustrating one form of the joint according to the invention, Fig. 2 is a longitudinal section showing a modified joint structure, Fig. 3 is a longitudinal sectional view illustrating the assembly of the parts of the joint of Fig. 1, Fig. 4 is an end view of the assembly device of Fig. 3, Fig. 5 is a longitudinal sectional view showing a modified assembly structure in connection with the joint of Fig. 2, Fig. 6 is an end view of the device of Fig. 5, and Figs. 7, 8 and 9 are longitudinal sectional views illustrating further forms of the joint.

DESCRIPTION

The originality of this invention rests on the fact that the coupling is divided into two parts, namely, the organs of stanchness proper, formed on one hand by rubber gasket and counter-flange, and on the other hand by the tightening organs. The first named organs remain in place, while the other organs are removed when forming an integral part of the coupling.

There is thus obtained a coupling of great simplicity and low manufacturing expenses.

The tightening organs, generally formed by a series of bolts, keys, etc., suitable of transforming manual effort in compression of the rubber gasket, form no part of the coupling proper and are substituted by a press for the same purpose the action of which is however temporary. Thereafter, permanence of the effort developed is obtained by different mechanical devices forming part of the present invention and the description of which follows. Once obtained this immobilization, the press may be removed in order to serve in forming the next coupling.

The means of immobilization employed in the most common case of cast iron pipes utilize devices already well known, as wedges, keys, bayonet, expansion springs, bolts, etc. Before passing to describe these devices let us examine the advantages presented by these couplings.

A. ADVANTAGES OF THE NEW COUPLING

The couplings forming subject of the present invention own the well known advantages of other couplings, as follows:
1. They are elastic, i. e. they permit of an important angular free motion of the pipes without detrimental effect to stanchness;
2. They offer a minimum of contact between rubber gasket and fluid conveyed;
3. They resist to any type of fluid, provided a suitable choice is made of the quality of rubber employed in manufacturing the gasket;
4. They are strong and, except the disposition described under item 2, are of easy assembly and disassembly;
5. They offer easy protection against corrosion;

Furthermore, they own the following particular advantages:
1. They occupy a minimum of space, the receptacles employed having external dimensions equal to those of receptacles of common type;

2. They are rigid and compact;

3. They employ a minimum of pieces and weight of pieces, thus rendering them essentially economical;

4. They are of easy manufacture and do neither require any special external form of receptacle (in case of cast iron pipes), nor any intricate form of the single reduced flange with a gasket of cross-sectional area of surface inferior to 5 sq. cm.

5. They suppress at each coupling the necessity of bolts or tightening devices, which are substituted by a press for assembling;

6. They avoid any possibility of rupture of the flange after positioning;

7. They are practically as insensible to corrosion as the pipes proper;

8. They do not permit, due to their construction, of any inequality of pressure on the rubber gasket.

Let us now examine the practical means of affording the coupling subject of the present invention.

B. IMMOBILIZATION DEVICE BY MEANS OF A CIRCULAR SPRING

Description

This coupling is formed (see Figure 1), besides the receptacle 4 and the smooth end of the pipe, by a rubber gasket 1 pressed into its housing by a circular flange 2 maintained in position by an open circular spring 3. This spring, made of steel, bronze or any other metal, is given a larger diameter than the diameter of its housing, in such a way as to have a tendency to open.

The relative position of these pieces when in place is represented cross-sectionally in Figure 1.

There is still to be noted a single slot, presenting a width of 1 cm. permitting of removing the spring and disassembling the coupling.

*Assembly.*—(See Figure 3.) In order to make up the coupling, first there should be placed, on the smooth end of the pipe, spring 20, counter-flange 21 and the rubber gasket.

Thereafter, the smooth end is placed into the receptacle and the different above mentioned organs are manually disposed in the farthest possible position corresponding to Figure 3.

Then the press for assembling is adapted (according to the following description).

By progressively tightening the bolts, pieces 20 and 21 reach by little and little their definitive localization. Spring 20 stops advancing, favoured in this motion by a suitable shape of pieces 21 and 24, and takes its place in the slot 23.

Following this, the press is disassembled, and the coupling is ready for use.

In case the pressure obtained on the coupling is not sufficient, the spring may be substituted by another larger wire.

*Advantages and drawbacks.*—Among all the couplings presented by cast iron pipes it is doubtless the easiest one to position, but it requires a very high grade of precision in dimensions in order to obtain sufficient stretching of the ring 22, yet without requiring an abnormal effort.

*Press for assembling.*—This press is made up (see Figures 3 and 4) by two flanges formed by two pieces joined by means of 4 (or more) bolts. One of the flanges 25 is disposed behind the receptacle and rests against it by means of a surface of toric revolution 28. Notwithstanding being formed by two independent pieces, either of them provided with two bolts 26, flange 25 forms a rigid assembly when bolted together with flange 27. It is only necessary to cross the plans of section at 90° to one another.

Rigidity of the assembly is obtained by a turning adjustment of flange 27 on flange 25. In order to afford a greater reliability, both parts of flange 27 may be keyed to one another, thus avoiding any deformation of the assembly (31—32).

Flange 27 is made up by a T-shaped welded profile, the internal portion of which is provided with 8 (or more) fingers (24), by means of which it exerts its pressure on the coupling.

Thus it is sufficient to tighten uniformly the bolts 29 in order to push spring 20 to its place. The gap present between flange 27 and the pipe permits of observing the work done.

The time necessary for assembling the press and forming the coupling does not exceed a few minutes.

C. BAYONET DEVICE

*Description.*—This coupling (see Figure 2) is made up of three pieces: rubber gasket, a supporting ring 9 and a flange 10.

Flange 10 exhibits 4 (or more) teeth 13 the form of which is represented in plane 18. These teeth are housed in 4 (or more) recesses provided on the receptacle.

*Assembly.*—It is made up by means of a press similar to the one previously described (see Figures 5–6), but its fingers 52 engage corresponding slots of flange 10, rendering thus rigid in rotation the pieces 50 and 55. Flange 50, ring 49 and gasket 48 are placed on the smooth end which is then introduced into the receptacle 51. Following this, the press is assembled. Once the teeth of the flange appear in the openings corresponding to the receptacle, one exerts the desired pressure and passes to turn flange and press in order to reach the positions shown in Figure 2. In one of the housings 16 of the receptacle there may be disposed a key 17 in order to avoid rotation of the flange in opposite direction. Piece 9 only serves to permit of rotating the flange relatively to the rubber gasket. In this case the bearing of the press on the receptacle may be achieved by a series of balls (see Figure 6) 61 suitably disposed in their separate housings 59 and maintained at a distance by means of springs 60.

Nevertheless it is not absolutely necessary to use this disposition if one provides lubrication of the contact between press and pipe. In this case the press of Figure 3 may be employed.

*Advantages and drawbacks.*—The assembly is obtained very rapidly, but the construction is more intricate, requiring a better grade of manufacture.

D. DISPOSITION OF PACKING BY MEANS OF METALLIC WIRE

This coupling is similar to the previous ones. The press employed for assembling is the same.

This coupling is formed (see Figure 7) by the rubber gasket, a flange 34 and a wire 35 which withstands removal of the flange once in place in the gap left free between flange 34 and receptacle 37.

*Assembly.*—Press of Figure 3 is employed. Once tightened the coupling, one introduces the metallic wire into the gap provided between 34 and 37. This wire acts as a wedge and maintains piece 34 in its place. The wire ought to be positioned by means of a chisel utilizing the gaps left free between the teeth of press 30 prior to removing the same. The ends of the wire are bent in right angles in order to permit of its removal when disassembling the coupling.

*Advantages and drawbacks.*—The system is very simple, but the positioning requires more time and is delicate. Similarly to the device of Figure 1, the diameter of the wire may vary according to requirements.

Any coupling that does not agree to the trials may thus be corrected after a new application of the press.

E. DEVICE FOR PACKING BY MEANS OF LEAD (FIGURE 8)

*Description.*—The coupling is similar to the preceding ones, but once in place one casts lead 40 into the gap left between flange 39 and receptacle 42. Prior to removing the press, the lead must be stamped in until replenishment, in order to avoid any recoil of flange 39.

*Advantages and drawbacks.*—This coupling does not offer any advantages in comparison with others. It has the disadvantage of requiring molten lead as well as a press of form and dimensions suitable to permit of applying clay on the coupling, necessary to cast the lead. Disassembly is more complicated, however the dimensions of the different pieces may be much less exact, the joining being always obtainable under good conditions.

F. PACKING DEVICE BY MEANS OF HELICAL KEYS

*Description.*—This coupling is very similar to that of Figure 2. Notwithstanding, due to the form of the teeth on flange 44 and corresponding apertures on the receptacle, it enjoys no motion of rotation during assembly. The press is the one illustrated at Figures 3-4. Once the coupling tightened, keys of sheet iron 45 are introduced into the gaps left free between receptacle and the teeth of piece 44.

*Advantages and drawbacks.*—Variations in measure are of no importance to the coupling. It will always be possible to obtain a convenient tightening. Manufacturing of the pipe is more intricate, there being necessary 4, 6 (or more) keys according to the diameter of the pipe. Disassembly is very simple.

G. OTHER DISPOSITIONS FOR PACKING

*Description.*—There may be devised other devices for fixing the flange after tightening of the coupling by means of the press. There have been described merely the most elementary ones and, doubtless, the most simplest. However the fixing may be obtained by means of cotter pins, bolts, helical ramps, molten metals or materials other than lead.

The devices presented have been outlined for application in the internal portion of the receptacle, in such a way as to reduce weight and overall dimensions of the constituting elements. Notwithstanding the same dispositions modified may be applied to the exterior of the receptacle without representing a novelty.

The shape of the rubber gasket or of the receptacle may be varied without therefore representing any new element.

H. OTHER TYPES OF PIPE

The couplings which we have hitherto presented have been specially applied to cast iron pipes. They are nevertheless appliable to other types of pipe of any other material employed in their manufacture, as steel, cement, etc. In the case of steel pipes, there may be employed means suitable to this metal, as adjustment by friction, permanent deformation of one of the joined parts, welding, etc.

Taking into consideration the above description, we may define as follows the claims of the invention:

1. A pipe joint for a bell and spigot ended pipes comprising a bell-shaped section on one end of the bell end pipe and comprising a rounded portion and a second rounded portion consisting of a smaller section than the first-mentioned rounded portion, and spaced therefrom, a gasket of pliable material in the first-mentioned rounded portion adapted to contact both pipe ends, an annular flange member in contact with the gasket, and a spring ring in the second-mentioned rounded portion bearing against the flange to force the pliable gasket against both pipe ends by means of the flange.

2. A pipe joint according to claim 1, in which the gasket is composed of rubber.

3. A pipe joint according to claim 1, in which the rounded portions act as abutments for the spring ring and the gasket with the flange member between the two.

YVES MATHIEU.

REFERENCES CITED

The following references are of record in the file of this patent:

UNITED STATES PATENTS

| Number | Name | Date |
|---|---|---|
| 1,290,205 | Howell | Jan. 7, 1919 |
| 1,486,777 | McWane | Mar. 11, 1924 |
| 1,758,454 | McWane | May 13, 1930 |
| 1,958,011 | Moore | Aug. 8, 1934 |